Nov. 7, 1950    C. W. WALZ ET AL    2,528,806
BEET HARVESTER

Filed Nov. 9, 1945    6 Sheets-Sheet 1

INVENTORS
CLAUDE W. WALZ
HOWARD F. CLAUSEN
ATTORNEYS.

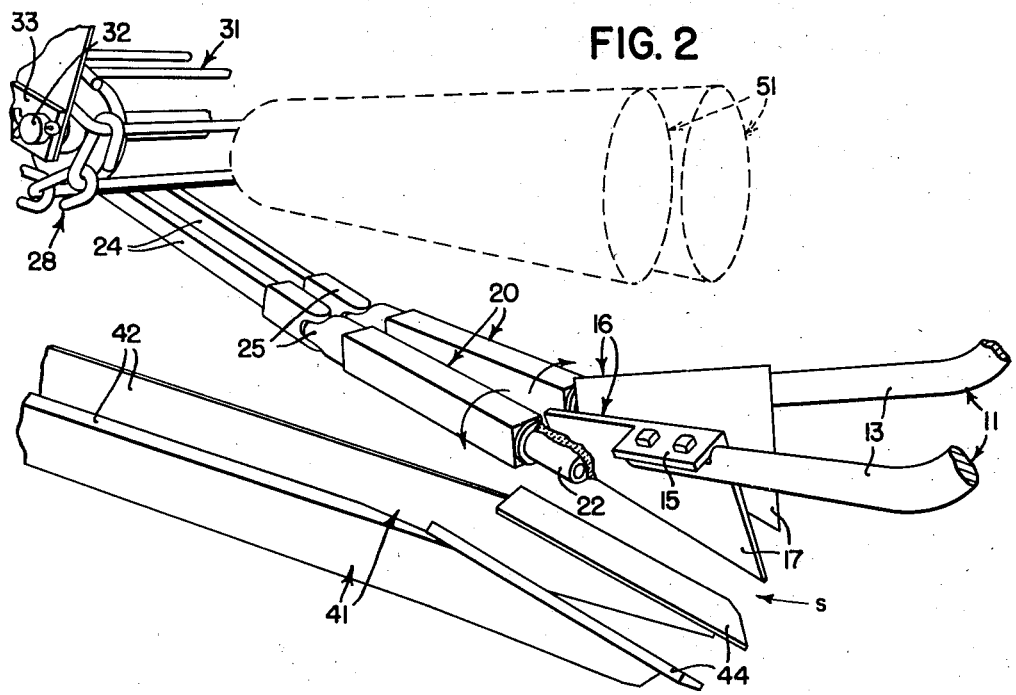
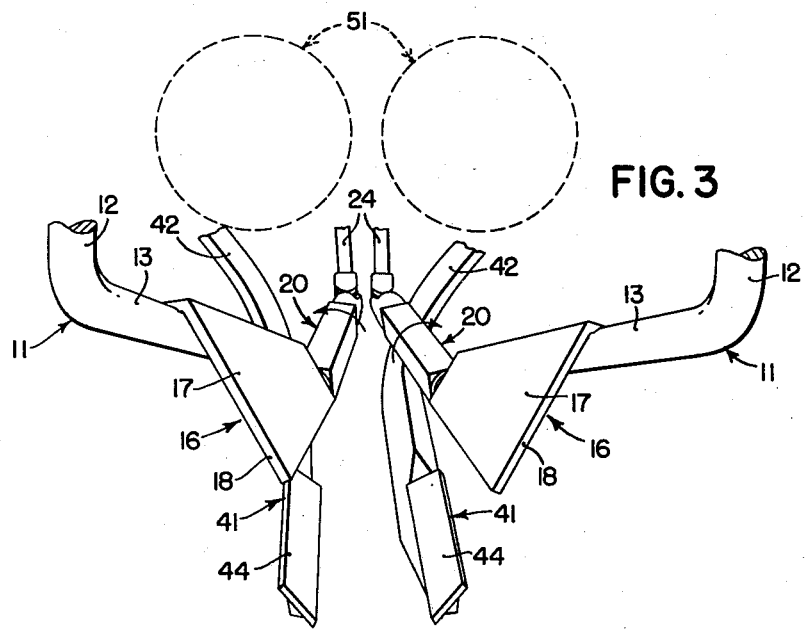

Nov. 7, 1950  C. W. WALZ ET AL  2,528,806
BEET HARVESTER
Filed Nov. 9, 1945  6 Sheets-Sheet 3
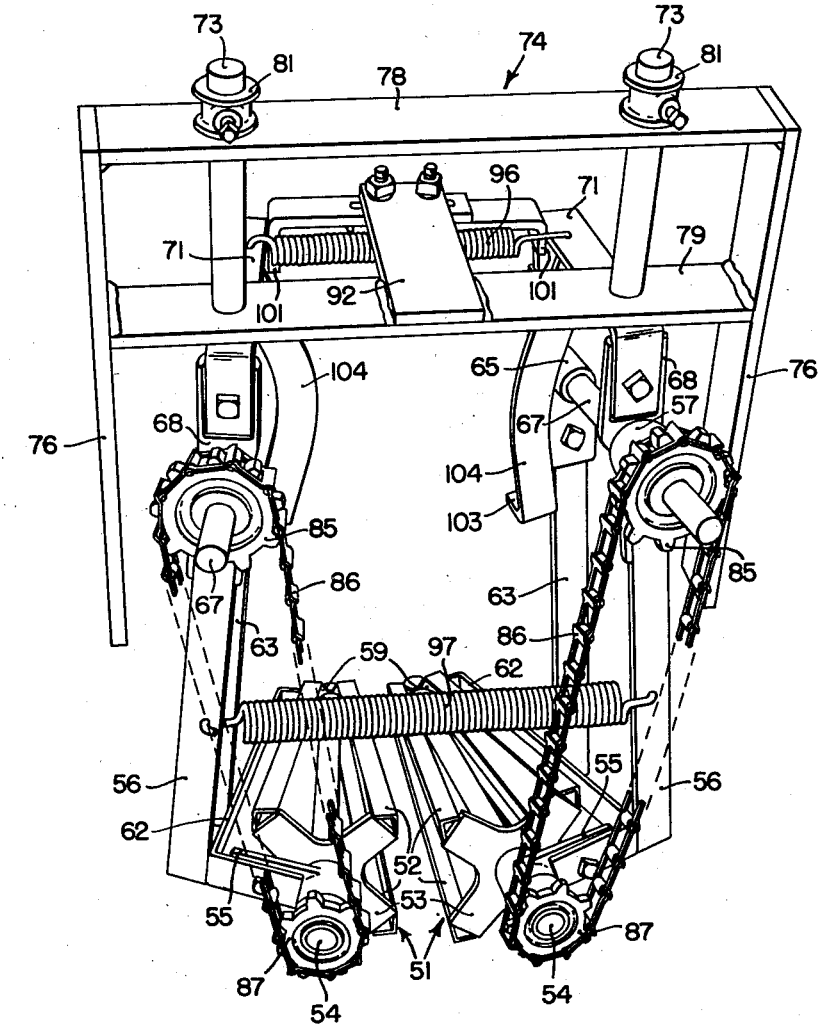
FIG. 4
INVENTORS
CLAUDE W. WALZ
HOWARD F. CLAUSEN
BY
ATTORNEYS.

INVENTORS
CLAUDE W. WALZ
HOWARD F. CLAUSEN

Nov. 7, 1950  C. W. WALZ ET AL  2,528,806
BEET HARVESTER
Filed Nov. 9, 1945  6 Sheets-Sheet 6

INVENTORS
CLAUDE W. WALZ
HOWARD F. CLAUSEN
BY
ATTORNEYS.

Patented Nov. 7, 1950

2,528,806

UNITED STATES PATENT OFFICE 2,528,806

BEET HARVESTER

Claude W. Walz and Howard F. Clausen, Rock Island, Ill., assignors to Deere & Company, Moline, Ill., a corporation of Illinois Application November 9, 1945, Serial No. 627,683

13 Claims. (Cl. 55—106)

The present invention relates generally to harvesting machines and more particularly to harvesters for root crops and the like, especially sugar beets.

The object and general nature of this invention is the provision of a root crop harvester in which provision is made to free the crop roots from the ground without bringing up objectionable quantities of soil. More particularly, it is a feature of this invention to provide a harvester in which substantially no clods are formed when pulling the beets or other crop, especially clods of a size similar to a beet and which under certain conditions tend to pass through the machine with the beets.

A further and important feature of the present invention is the provision of new and improved ground penetrating crop engaging and lifting means which is effective to raise the beets or other crop higher than ordinary machines but without lifting excessive quantities of soil with the crop. More specifically, it is an important feature of this invention to provide substantially vertically spaced pairs of pulling members, the vertical spacing between the upper and lower pairs permitting a relative flow of soil therebetween so as to secure an effective crop-lifting action but without raising clods and the like. An additional feature of this invention is the provision of upper and lower points or puller members arranged so that the upper members may operate quite close to the ground surface and serve a dual function, namely, holding the soil down while forcing the beets or other crop upwardly.

Another important feature of the present invention is the provision of crop engaging means in the form of horizontal bars or the like movable about a generally horizontal axis adjacent the upper pair of lifting members, which bars serve not only to break up any clods or the like but also to impart an additional raising action to the beets or other crop engaged thereby. In one form of this invention the auxiliary lifting bars are arranged in the form of a horizontally disposed rotatable cage at each side of the central plane of the device, each rotatable member being mounted for laterally inward and outward movement and also for movement about a vertical axis, whereby the auxiliary lifters may move about in handling the beets or the crop and accommodate not only various sizes but also may engage two beets simultaneously.

In another form of the invention a plurality of generally horizontally disposed bars are connected together to form a pair of vertically arranged endless chains, with the lower bars of each chain arranged to move about a generally horizontal axis adjacent the upper lifting members, and further, the endless chains are arranged to operate on a curve so as to impart not only an upward movement to the beets or other crop but also a movement in the longitudinal direction, rearwardly, for example. Still further, the two auxiliary lifting mechanisms just referred to are arranged to impart a somewhat greater velocity to the larger beets than to the smaller beets so that during the forward movement of the harvester, whereby there is no appreciable tendency for the larger beets to be overturned forwardly before they are raised or lifted out of the ground.

These and other objects and advantages of the present invention will be apparent to those skilled in the art after a consideration of the following detailed description, taken in conjunction with the accompanying drawings in which the preferred forms of this invention have been illustrated.

Referring now to the drawings:

Figures 2 and 3 are enlarged fragmentary perspective views showing in particular the relation between the lower points or lifting members, the upper pair of lifting members and the rotatable auxiliary lifting devices, Figure 2 being a view taken generally from the side of the lifting unit while Figure 3 is a view taken approximately from the front;

Figure 4 is a fragmentary perspective view showing a portion of the oscillatable mounting supports for the rotatable auxiliary lifting elements;

Figure 5:
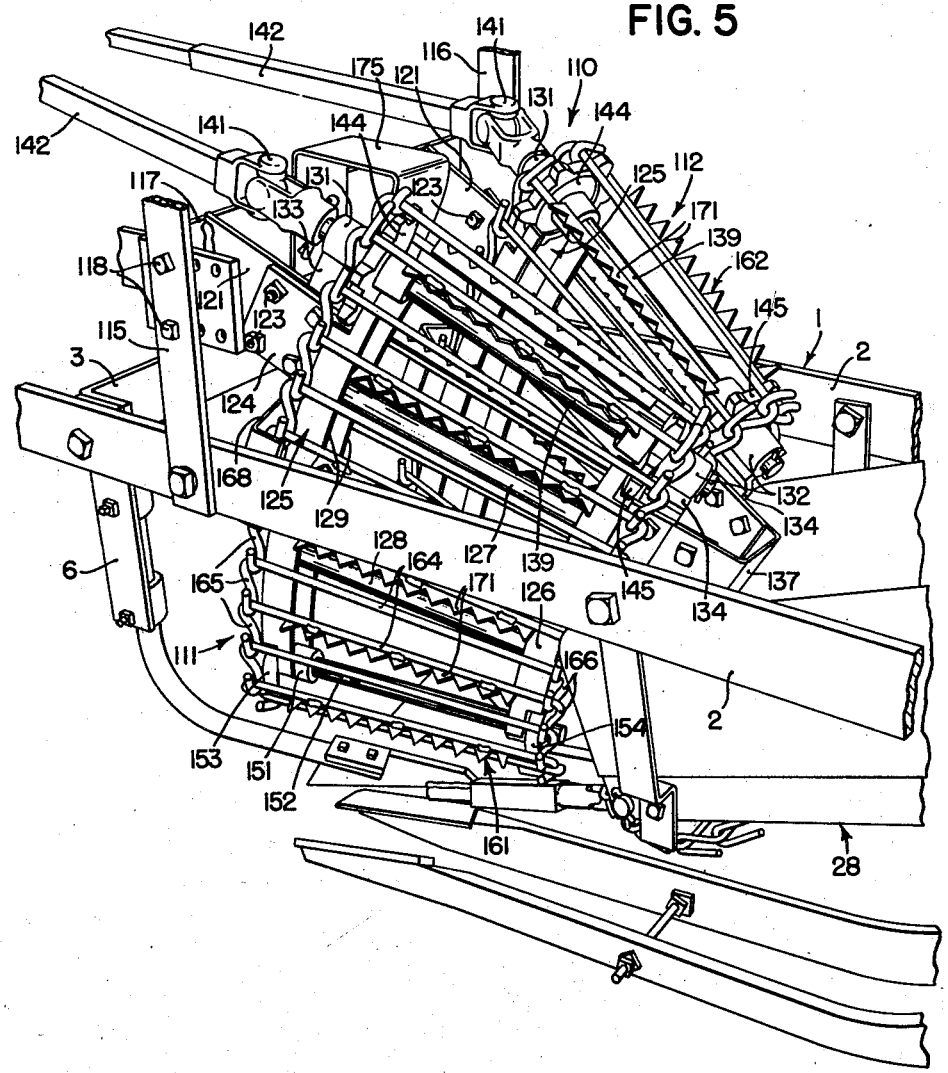
Figure 6:
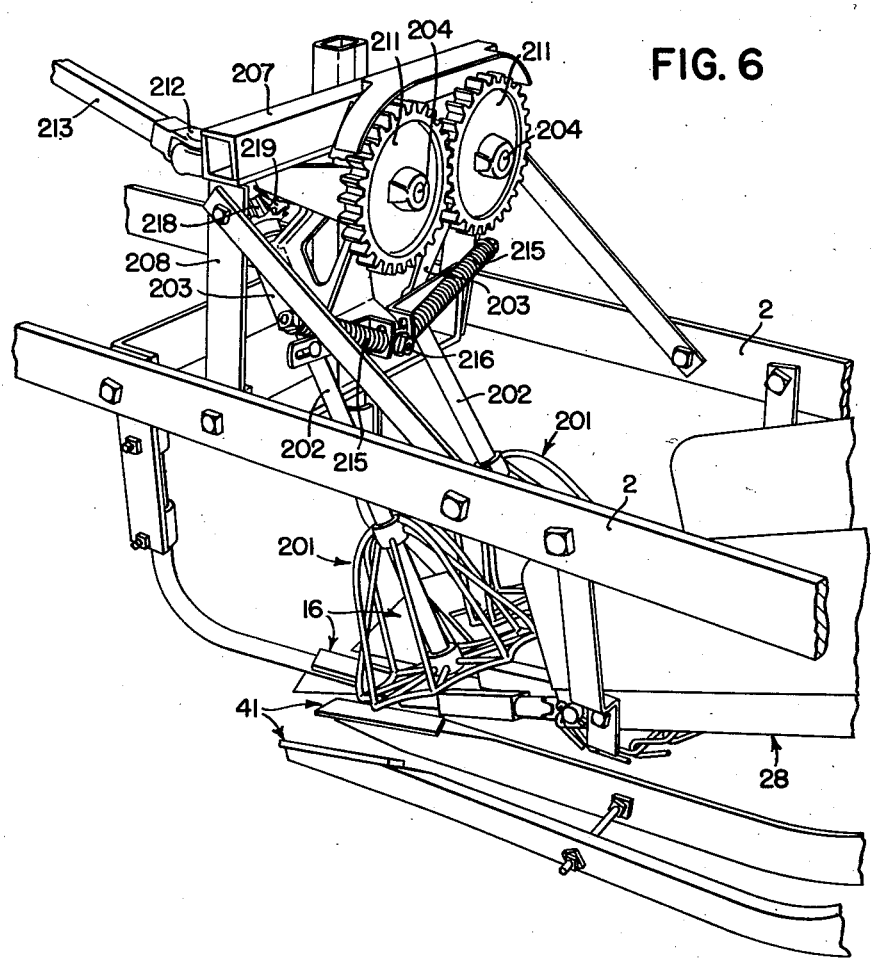
Figure 7:
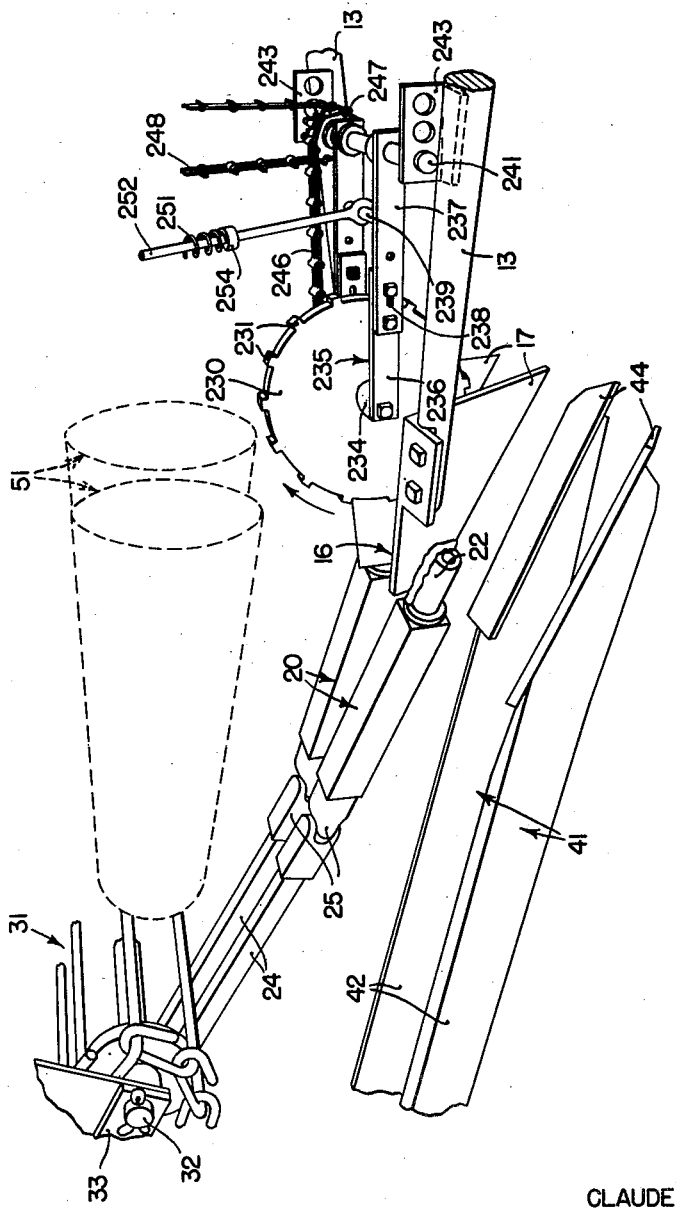

Figure 5 is a perspective view showing a modified form of lifting mechanism; and Figure 6 is a perspective view showing another modified form; and Figure 7 is an enlarged fragmentary perspective view, similar to Figure 2, showing a modified form of the present invention in which means is provided for preventing the beets from being overturned forwardly during the progress of the machine along a row of beets.

In the form of the invention shown in Figures 1–4, the frame of the harvester, which is shown as particularly designed for harvesting sugar beets, is indicated by the reference numeral 1 and comprises a plurality of generally longitudinally disposed frame bars 2 connected together by one or more cross bars 3 bolted thereto, as at 4. Each of the frame bars 2 is provided with a depending bracket 6, preferably secured to the frame 1 by the above mentioned bolts 4, and each bracket 6 is provided with a pair of sleeves 7 and 8, preferably welded thereto, each bracket 6 being tapped to receive a pair of set screws 9, one for each of the sleeves 7 and 8. Each of the brackets 6 serves as means for connecting a lifting member standard 11 to the frame. Each standard 11 has a vertically disposed section 12 that is disposed in position in the bushings 7 and 8, being held therein by tightening the set screws 9. Each standard 11 also includes a rearwardly directed portion 13 which is flattened, as at 14, and apertured to receive bolts or other securing means by which a bracket section 15 of an upper puller point member 16 is connected to the standard 11. Each lifting member or puller point member 16 comprises a forward section 17 which is disposed in a generally vertical position and has a forwardly and upwardly facing edge 18. Each member 16 also includes a rear rotatable section indicated in its entirety by the reference numeral 20. The rear rotatable section 20 comprises a polygonal, preferably square, part 21 having a forward spindle portion which is rotatably mounted in a journal 22 that is fixed, as by welding, to the rear portion of the forward puller point member section 17. Each puller point member 16 is constructed as just described, and the forward fixed sections 17 are disposed in upwardly diverging planes, as best shown in Figure 3. The sections 17 are also arranged in rearwardly converging relation and are dimensioned and angled so as to exert an upward force on the beets or other crops. The rotatable portions 20 of the two upper lifting members 16 are driven by any suitable means, such as a pair of generally longitudinally extending shafts 24, each connected at its forward end by a universal joint 25 to the associated rotatable section 20. Preferably, the shafts 24 are disposed just underneath an upwardly and rearwardly extending conveyor or elevator 28 which at its forward end is supported by a pair of straps 29 from the frame bars 2. The conveyor 28 includes an endless chain 31 that is supported at its forward portion on rollers or sprockets carried by a transverse shaft member 32 journaled in the front ends of bars 33 forming the frame of the conveyor unit 28. The lower end of each of the straps 29 is bolted to the forward end of the associated conveyor frame bar 33 and the upper end of each of the straps 29 is bolted, as at 35, to the associated frame bar 2.

The lower pair of puller point members or lifting members is disposed well below and slightly to the rear of the puller members 16, each being indicated by the reference numeral 41. Each lower member 41 comprises a generally longitudinally extending beam section 42 which is fastened together, by any suitable means, such as a bolt 43, and extends upwardly and rearwardly and is attached to the harvester frame 1 in any suitable manner. The forward end of each of the beam sections 42 is shaped so as to receive a puller blade section 44. Each puller blade section 44 is arranged in a forwardly diverging position and faces generally upwardly and forwardly. The space between the lower blades 44 and the upper puller members 16 is indicated in Figure 2 by reference character s, it being noted also from this figure that, as to the upper puller members 16, the sections 20 form rear rotatable sections while the forward sections are relatively rigid. Both pairs of upper and lower puller point members are adjustable vertically relative to the frame 1 and also with respect to each other.

The points are so arranged that, in operation, the lower members 41 act upon the lower portions of the beets or other crop while the upper puller members 16 operate quite close to the surface of the ground and act upon the upper portions of the beet, both sets of points being adjusted laterally as well as vertically so as to act at about the same time on the same beet or other crop. While the relatively deeper penetrating point members 41 tend to raise up a ridge or mass of soil at the same time that the beet is lifted, the upper point members 16, operating closely adjacent the surface of the ground, act to hold this upwardly urged mass of soil down while, at the same time, acting upon the beet to impart an upward movement thereto additional to that initially imparted by the lower points or blades 44. In this way, a tendency to form clods in hard ground and to break up the ground into pieces about the same size as the beets themselves is practically entirely eliminated. The arrangement of the beet engaging and lifting members, their support from the frame 1 and the beet-receiving conveyor 28, are common in the several forms of this invention, and hence the same reference numerals have been employed for identical parts in the several forms of this invention.

Figure 1:
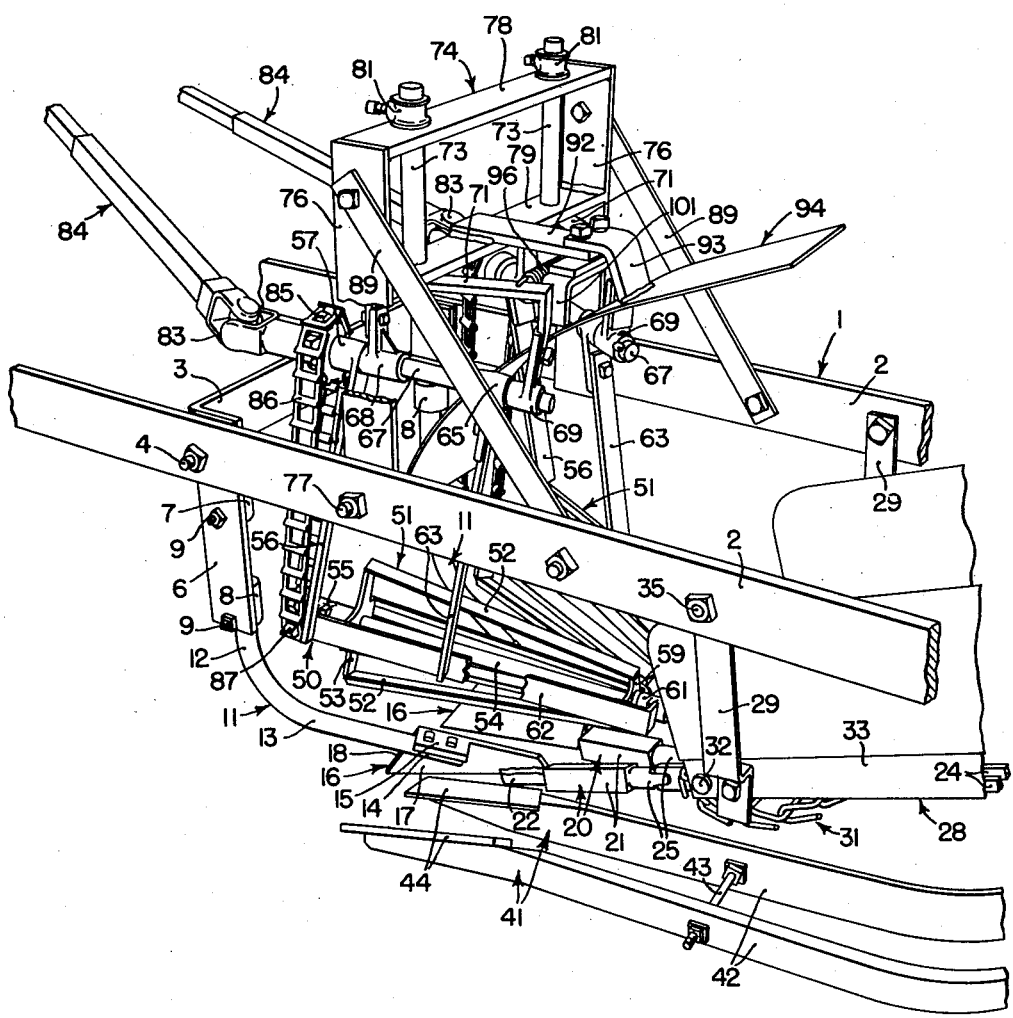
Figure 1 is a perspective view of the lifting mechanism of a beet harvester in which the principles of the present invention have been incorporated, the form of the invention shown in Figure 1 incorporating a pair of laterally shiftable and oscillatable kicker wheels.

According to the form of the invention shown in Figure 1, a pair of auxiliary beet engaging and lifting units are carried by the frame 1 in a position thereon to receive the beets that are loosened and at least partially raised by the upper and lower pairs of lifter members described above. Since each of the two auxiliary lifting units shown in Figure 1 is substantially identical with the other, except for certain parts that may be right- or left-hand, respectively, a detailed description of one of these units will suffice. Referring now to Figure 1 in which the left hand auxiliary beet-engaging and lifting unit is indicated by the reference numeral 50, the latter comprises a rotatable member 51 comprising a plurality of bars 52 in the form of angle members secured, as by welding, at their forward ends to a disk 53 or similar member which is secured, as by welding, to the forward portion of a shaft 54 which extends generally longitudinally and at its forward end is supported for rotation in a journal 55 carried at the lower end of a bar 56 which is connected at its upper end to a journal member 57. The rear portion of the shaft 54 has a rear disk member 59, secured thereto by welding or the like, and the rear end of the shaft 54 is carried in a journal 61 that is secured to the rear end of a longitudinal bar 62, the forward end of which is welded to the lower end of the bar 56 and also to the lower end of a bar 63 which extends upwardly, generally parallel to the bar 56 and at its upper end is connected to a journal member 65 rearwardly of the forward journal member 57. The rear ends of the bars 52 are secured, as by welding, to the rear disk 59, and since the latter disk is smaller than the forward disk 53, the bars 52 and associated parts thus form a rearwardly tapered kicker wheel member which is in the form of a frusto-conical part of somewhat open construction, permitting fragments of soil and the like to drop therethrough. The upper journals 57 and 65, connected to the upper ends of the bars 56 and 63, are mounted on an upper shaft 67 which is supported for rotation in a pair of journal members 68 and 69, each of which is provided with an extension which is bolted to a depending portion of a yoke member 71. The yoke 71 is secured to the lower end of a vertical shaft section 73 that is mounted for oscillatory movement about a generally vertical axis in a vertically extending frame structure 74. The latter includes a pair of vertical bars 76 secured, as at 77, to the frame 1 and a pair of cross bars 78 and 79 which are welded or otherwise secured to the vertical bars 76, the transverse bars 78 and 79 being apertured to receive the vertical shaft sections 73. Each of the latter carries a collar 81 at its upper end whereby each of the yokes 71 and associated parts is supported for operation on the harvester frame 2.

The forward end of each of the shafts 67 is connected by means of a universal joint 83 to a driving shaft section 84, which preferably but not necessarily is in the form of a pair of telescopic shafts extending forwardly to a point of connection with a suitable source of operating power. A sprocket 85 is fixed to the forward end of each of the shafts 67 and receives a sprocket chain 86 which at its lower end is trained over a lower sprocket member 87 that is fixed to the lower or kicker wheel shaft 54, whereby rotation of the driving shafts 84 serves to drive the kicker wheels 51. The frame structure 74 is reenforced by a pair of braces 89 which may be bolted to the frame bars 76 and the main frame bars 2. A bracket 92 is fixed to the lower cross bar 79 and at its rear end receives a bracket 93 which is welded to a curved shield member 94 that is disposed in an upwardly and rearwardly extending position generally over the kicker wheels 51 and, at its forward end, fairly closely adjacent to, or between, the forward ends of the kicker wheels 51. Being curved in a longitudinal vertical plane, any beets or other crop thrown upwardly against the curved shield 94 will be directed rearwardly into the conveyor 28.

The operation of the harvester as described above is substantially as follows:

The harvester is driven down a row of beets or other crop at such depth of operation that the lower points or lifting members 41 operate well under the ground surface so as to act on the lower portions of the beets while the upper lifter members 16 act on the upper portions of the beets. The lower lifting members 41 are disposed somewhat closer together than the upper lifting members but extend rearwardly and upwardly at a somewhat greater angle, as shown in Figure 2, while the upper members 16 are disposed somewhat in a more nearly horizontal position and slightly farther apart but also slightly in advance of the lower lifters 41. These relations have proven to be such that the upper and lower pairs of lifting members act upon the same beet at about the same time while the major portion of the soil that is, mainly, loosened by the lower lifter members 41, passes rearwardly over the lower points but is held down by the upper members which operate closely adjacent the ground surface. However, due to the shape of the upper lifter members, particularly their upper and laterally inwardly facing forward fixed portions and the rearward convergence thereof, the beets or other crop initially loosened and at least partially lifted by the lower lifter members are raised an additional amount by the upper lifter members while the latter function, as aforesaid, to hold down the greater proportion of the soil so as to prevent the latter being thrown upwardly or broken up into portions about the size of beets. The rear rotatable sections 20 of the upper lifter members are driven by the rotation of the shafts 24, the latter being driven from any suitable source of power, and, the rear rotatable sections 20 being rotated in the direction of the arrows shown in Figure 3, it will be seen that as the harvester progresses forwardly and each beet raised by the rearwardly converging lifter members, the rotation of the rear rotatable sections 20 will act to impart additional lifting action to the beets, whether they are the small beets that are engaged by the rear portions of the rotatable parts 20 or the more forward portions thereof which engage the larger beets. Also, during the progress of the machine, the smaller or tail portions of the beets, even of the larger beets, will be engaged by the rotatable members 20 so that each beet is raised in a positive upwardly directed motion sufficient to project them well above the adjacent fragments of the soil in the row.

The beets that are projected upwardly by the rotating sections 20, or, in the case of the larger beets, possibly by the forwardmost sections 17, are engaged by the rotatable kicker wheels 51 whereby a further raising or lifting action is imparted to the beets. As best shown in Figures 1 and 2, the shafts 54 are disposed in a rearwardly and slightly downwardly converging relation. This places the lower bars 62 in approximately a horizontal position. The bars 52 are spaced apart on the disks 53 and 59 a distance sufficient to accommodate the largest beets. Furthermore, and as shown in Figure 4, the kicker wheels 51 are operated in timed relation so that the bars 52 on one kicker wheel successively come into engagement or registration with the corresponding bars on the other kicker wheel. The larger end of each of the kicker wheels 51 is disposed forwardly so that, the forward portions of the bars 52 have a somewhat greater peripheral velocity than the rear portions, the portions having the greater peripheral velocity being those portions which come into engagement with the larger beets, the smaller beets being engaged principally by the more rearward portions of the bars 52. Elevating the larger beets a somewhat greater velocity than the smaller beets insures that at least the major portion of even the larger beets will be lifted out of connection with the ground before the forward travel of the machine creates any tendency to push the larger beets over forwardly. Disposing the kicker wheels 51 in a rearward and downward position brings the areas of contact between the rear portions of the bars 52 and the smaller beets somewhat closer to the ground surface, and hence facilitates engagement of even the smaller beets by the kicker wheels 51. The latter members, being of cagelike or open construction, cooperate with the upper pairs of lifter members 16 to break up any clods or soil fragments that might otherwise tend to pass into the machine.

The two kicker wheels 51 are mounted for oscillation about vertical axes and for laterally inward and outward swinging, by the supporting means for the yokes 71 described above. In order to insure operating contact between the kicker wheels 51 and the beets, whether they are large or small, a spring 96 is connected to the portions of the yokes 71 rearwardly of their vertical axes 73. The spring 96 thus tends to cause the rear portions of the kicker wheels to move toward one another, thereby preserving the forwardly diverging relation of these members. Further, and in order to insure swinging the kicker wheel supporting structures, comprising the bars 56, 62 and 63, toward one another, a spring 97 is connected between the forward bars 56, as best shown in Figure 4, the spring thus tending to keep the kicker wheels 51 in positions as close together as the beet or beets therebetween will permit. It is to be noted that by virtue of this construction, the kicker wheels 51 will engage firmly and positively two beets that may simultaneously be engaged therebetween, and this is true whether the beets are of the same size or of different sizes and whether the rear beet or the forward beet is larger. Secured to the bracket 92 is a pair of stops 101 against which the spring 96 tends to hold the rear portions of the yokes 71, and stops 103 are formed at the lower ends of depending members 104 that are carried by the yokes 71 to cooperate with the rear bars 63 to limit the laterally inward swinging movement of the kicker wheels 51. These latter stops are omitted from Figure 1 in the interest of clarity but are shown in Figure 4.

In Figure 5 a somewhat different form of auxiliary beet lifting unit is shown. As mentioned above, the form of the invention shown in Figure 5 includes the same construction so far as the frame and the upper and lower pairs of lifting members are concerned. Referring now to Figure 5, the auxiliary beet lifting mechanism is indicated in its entirety by the reference numeral 110 and comprises a pair of endless chain units 111 and 112. These units are substantially identical and hence a description of one of them will suffice. However, certain parts are made right hand or left hand as necessary. In this form of the invention, the main frame 1 is provided with a pair of upstanding bars 115 and 116 suitably secured to the bars 2 in any suitable manner. A relatively heavy cross bar in the form of a yoke 117 is secured, as by bolts 118, to the vertical bars 115 and 116. Welded to the cross bar 117 is a pair of downwardly and rearwardly extending brackets 121, the rear ends of which are apertured to receive bolts 123. Secured to each of the brackets 121 by a cooperating attaching bracket 124 is a generally vertically disposed curved channel member 125. By virtue of the aforesaid brackets 121 and 124, the two curved channels 125 are rigidly fixed to the frame of the harvester in substantially vertical positions. A pair of rear channel members 126 are provided and are respectively connected rigidly to the associated forward channels 125 through rigid pipe or bar members 127 and 128. The flanges 129 of the forward channels 125 face rearwardly while the flanges of the rear channels 126 face forwardly, the two curved channels being connected together by the members 127 and 128 in concentric relation. A pair of upper journals 131 and 132 are supported on the front and rear channels 125 and 126 by brackets 133 and 134 which are fixed to the associated channels rigidly, as by welding or the like. The rear brackets 134 are connected together by a reenforcing yoke member 137. The latter member cooperates with the front brackets 121 in maintaining the generally vertically arranged pairs of front and rear channels against lateral displacement. A shaft 139 is journaled for rotation in each pair of journals 131, 132 and at its forward end each shaft 139 is connected by a universal joint 141 with a driving shaft 142, the shafts 142 being connected in any suitable manner to a source of power. Sprockets 144 and 145 are fixed to the front and rear portions of each of the driving shafts 139, and the forward sprocket 144 is appreciably larger than the rear sprocket 145.

The lower end of each of the channels 125 and 126 is provided with a journal section 151 in which a lower shaft 152 is mounted for rotation. Forward and rear rollers 153 and 154 are mounted on the shaft 152, the rollers being fixed to the shaft 152 if desired, or the shaft 152 may be arranged to rotatably receive the rollers 153 and 154, in which case the shaft 152 need not rotate.

A pair of endless chains, indicated at 161 and 162, are mounted on the sprockets 144 and 145 and the rollers 153 and 154. Each of the chains 161 and 162 is made up of a plurality of generally longitudinally extending bars 164 and interconnecting sections 165 and 166 at the ends of the bars 164. The forward interconnecting sections 165 are longer than the rearward interconnecting sections 166 so that, in effect, each chain is curved or, when laid out as a development, is a part of a conical surface. The forward interconnecting sections 165 are adapted to ride along the forward edges of the channels 125, and these members being curved serve as guides for maintaining the chains 161 and 162 in a curved position. Clips 168 are provided and are fastened to the front channels 125 over the forward edges of the chains so as to hold them in position. Soil disintegrating toothed members 171 are fixed to selected teeth, these members being in the form of notched strips welded or otherwise fixed to the bars or certain of the bars 164.

The operation of this form of the invention is substantially as follows. The endless chain units 111 and 112 are mounted on the harvester so that the lower portions of the two chains operate around the rollers 153 and 154 in substantially horizontal positions and about axes defined by the lower shafts 152. The chains 161 and 162 are driven by the sprockets 144 and 145, and from Figure 5 it will be seen that the chains 161 and 162 occupy a curved position with the links or bars 164 generally radial. Hence, the forwardmost portions of the chains operate at a greater peripheral speed than the rear portions, it being remembered that the rear sprocket 145 is smaller than the front sprocket 144 and the rear roller 154 smaller than the forward roller 153. The front and rear channels 125 and 126 are so disposed that the endless chains, in effect, lie in forwardly diverging generally vertical planes. Hence, the larger beets or other crop are engaged by those portions of the endless chains which operate at the greater peripheral speeds. Hence, the larger beets are rapidly disengaged from the ground so that there is no tendency for the continued forward travel of the implement to overturn the larger beets forwardly. Moreover, the curved construction of the auxiliary lifting chains 161 and 162 tends not only to lift the beets but also to direct them rearwardly so that they are delivered into the conveyor 28. This is about the same action as is provided by the frusto-conical or cage-like kicker wheels 51 described above. If desired, one of the chains 161 and 162 may be driven at a speed different from the speed of movement of the other chain, or one of the chains may be held substantially stationary while the other chain is driven, thereby providing somewhat greater agitation for soil dislodging and other purposes than where the two chains 161 and 162 are rotated at the same speed. The cross bar 117 carries a shield 175 which extends generally in front of the curved chains and tends to prevent any beets from falling out from between the chains in a forward direction. Also, while the endless chain elements have been shown as carried by a rigidly mounted framework, it will be understood that the endless chains might, if desired, be mounted upon oscillatable and laterally swingable structures, such as that shown in Figure 1 in connection with the kicker wheels 51.

A third form of the present invention is shown in Figure 6 in which the horizontally disposed kicker wheels 51 are, in effect, replaced by a pair of kicker wheels 201 which are mounted for rotation substantially about generally vertically extending axes. Referring now to Figure 6, each of the kicker wheels 201 comprises a cage-like structure fixed to the lower end of a generally vertically arranged shaft 202. The upper end of each of the shafts 202 is mounted for rotation in a laterally swingable bracket member 203, and the upper portion of each bracket member 203 is mounted for lateral swinging on a shaft 204, the shafts 204 being by suitable journals carried by a cross bar 207 which is supported on the frame bars 2 by vertical members 208. The rear ends of the shafts 204 carry meshing gears 211 and the forward end of one of the shafts 204 is connected by a universal joint 212 to a drive shaft 213 that is connected by any suitable means to a source of power. The laterally swingable shaft-carrying bracket members 203 are held against outward swinging by yielding spring means 215, which includes a pair of springs connected at their outer ends to the brackets 203 and at their inner ends to a stud 216 that is carried in any suitable manner on the frame of the harvester. The upper end of each of the shafts 202 carries a bevel gear 218 which meshes with a companion bevel gear 219 on the associated horizontal shaft 204. Thus, the kicker wheel shafts 202 are rotated by the shafts 204. Beets or other crop loosened from the ground and raised at least partially by the upper and lower pairs of lifting members 16 and 41 are engaged by the rotatable kicker wheels 201 and projected generally upwardly and rearwardly to the conveyor 28.

Figure 7 shows a modified form of the present invention which prevents beets or other crop from being overturned. Under some conditions there may be an appreciable tendency for the beets or crop to be pushed over forwardly by the lifting members or points, and in order to provide means to hold the beets substantially upright we provide a rotatable wheel 230 having lugs 231 or other suitable means thereon facilitating the action of the wheel on the beets. The wheel 230 is rotated in the direction of the arrow shown in Figure 7. The wheel 230 is mounted on a shaft 234 which is journaled for rotation in a frame 235 preferably consisting of two pairs of straps 236 and 237 adjustably connected together, as by bolt and slot means 238. The strap sections 237 are connected rigidly together by a cross member 239 welded thereto. The forward portions of the straps 237 are apertured and mounted on a cross shaft 241 supported in a selected pair of openings formed in a pair of lugs 243 that are secured, as by welding, to the horizontal portions of the standards 11, it being understood that the wheel 230 and associated parts are, in Figure 7, shown as embodied in the harvester illustrated in Figure 2, and hence the harvester parts are indicated in Figure 7 by the same numerals employed in Figure 2 for the same parts. A sprocket (not shown) is mounted on the shaft 234 and is fixed to the wheel 230 in any suitable way, as by being fixed to the shaft 234 to which the wheel 230 is fixed. The sprocket just mentioned receives a driving chain 246 which at its forward end is trained over a double sprocket member 247 which also receives a driving chain 248 connected in any suitable way with the motor or other means which drives the other harvester mechanism.

The wheel 230 may be disposed in different positions fore and aft either by suitably adjusting the rear straps 236 relative to the forward straps 237, or by positioning the shaft 241 in different sets of openings in the lugs 243, or both, as desired. Normally, the wheel is urged downwardly by resilient means which may take the form of a pressure spring 251 disposed about a pressure rod 252 that extends downwardly and carries a collar 254 which receives the lower end of the spring 251. The lower end of the rod 252 is pivoted to the frame 235 in any suitable way, as by being connected to the cross member 239.

In operation, this form of the invention provides means to prevent the beets from being overturned forwardly. The wheel 230 is driven in the direction of the arrow and acts upon the beets, particularly the larger beets, to maintain the beets upright as the forward points 16 raise the beets from the mass of soil passing between the upper and lower points or lifting members through the space s. By virtue of the spring connection 251 and associated parts, the wheel 230 may rise and fall, as necessary, to permit the wheel to pass over the beets, especially the larger ones. The auxiliary lifting members 51 are spaced apart a distance sufficient to receive the wheel 230, which is relatively narrow, therebetween.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a beet lifter, a frame, two separate ground penetrating lifting means disposed in generally vertically spaced relation, said lifting means including a lower pair of ground-penetrating point members and an upper pair of ground-penetrating point members arranged substantially directly above the lower point members with a laterally extending unobstructed space therebetween, said lower lifting means adapted to loosen the soil about a beet or other crop, and the upper lifting means comprising substantially horizonal forwardly diverging members disposed substantially directly above and spaced apart a distance at their forward ends greater than the spacing between the lower lifting means and serving to not only lift the beet or other crop but also to engage the soil passing between the upper and lower lifting means and hold the soil from being forced upwardly with the beet or other crop, and means carried by said frame for holding said upper and lower lifting means in said vertically spaced relation.

2. In a lifter for beets or the like, a frame, lifting means adapted to loosen the soil and at least partially raise the beets or other crop, means for supporting said lifting means on said frame, driven crop engaging means disposed substantially directly above the best engaging portions of said lifting means, said crop engaging means having portions operating at different peripheral speeds, and means connected with said frame for carrying said beet engaging means in such position relative to said lifting means and longitudinally of said frame that both the lifting means and the driven crop engaging means operate below the ground and the portions moving at the greater speeds normally engage the larger beets or other crop.

3. In a harvester for beets or the like, a crop lifting unit comprising a pair of ground penetrating lower lifting members, a pair of upper ground penetrating lifting members, each of the latter including a forward plate member and a generally horizontally disposed rearwardly extending part rotatably mounted at its forward end on the upper rear portion of said plate member, said rotatable parts being adapted to engage the beet or other crop and elevate the same, there being an open space between said upper and lower lifting members to accommodate a flow of soil therebetween, and a pair of crop-engaging parts mounted substantially above the rotatable portions of said upper lifting members and including laterally spaced apart members rotatable about laterally spaced generally longitudinally extending axes lying approximately parallel to and closely adjacent the associated rotatably mounted parts of said upper ground penetrating lifting members and substantially directly above the latter.

4. In a harvester for beets or the like, a mobile support, generally downwardly and forwardly disposed crop engaging means adapted to penetrate the ground and lift the beets or other crop, means carried by said support above said crop engaging means for grasping and elevating partially lifted beets or other crop, comprising a plurality of crop engaging bars positioned to operate adjacent the ground surface and to move in that position about a generally horizontal axes, the front ends of the bars moving through a path of movement greater than the path of movement through which the rear ends of said bars move and means connecting the front and rear ends of said bars together to form a pair of substantially endless chains.

5. In a harvester for beets and the like, upwardly and rearwardly disposed relatively fixed lifting members engageable with the beets or the like for lifting them, and crop engaging means disposed above said lifting members and comprising a series of generally longitudinally extending bars movable adjacent the beet or other crop about a substantially horizontal axis for engaging the beet or other crop and moving it generally upwardly away from said lifting members, said bars being arranged in two sets and each set of bars forming a vertically positioned endless belt.

6. In a harvester for beets or the like, a mobile support, beet lifting means carried thereby for loosening the beets or other crop and lifting them at least partially, a pair of shafts carried by said mobile frame adjacent the ground surface and substantially in a horizontal position diverging forwardly, an upper pair of shafts also diverging forwardly but arranged on axes extending downwardly and rearwardly, sprockets mounted on said shafts in spaced relation, and a pair of beet engaging and lifting chains carried by said shafts, said lifting chains being adapted to engage a beet or other crop therebetween and directed upwardly and rearwardly.

7. In a harvester for beets and the like, a mobile support, lifting means carried thereby for loosening the ground and at least partially raising the beets or other crop, means comprising a pair of endless belts disposed generally in a vertical position and spaced so as to engage and complete the lifting of the beets or other crop, and means carried by the harvester and connected with at least one of said belts so as to operate one of said belts at a rate different from the other whereby to agitate the beet or other crop and free the same of adhering soil and the like.

8. In a harvester for beets or the like, a mobile support, lifting means carried thereby and adapted to loosen the soil and at least partially raise the beets or other crop, and a pair of generally vertically disposed endless chains having links arranged generally longitudinally and driven to engage the beets or other crop lifted by said lifting means, certain of said links having teeth acting to disintegrate clods, adhering soil, or the like.

9. An endless chain adapted to operate in a curved position, comprising generally radially arranged cross links, means connecting the ends of said cross links at one side of the chain, means connecting the ends of the cross links at the other side of said chain, one of said connecting means being shorter than the other, rotatable means supporting opposite portions of said chain including rotatable members, certain of said rotatable members being larger than the other or others and the larger rotatable members receiving the side portion of said chain having the longer connecting means, and curved guides between said rotatable members for supporting said chain in a curved position.

10. In a beet harvester, beet digging and lifting means comprising a frame, a pair of lower beet-engaging ground penetrating points, means fixedly connecting said lower points to said frame, an upper pair of beet-engaging ground penetrating points fixedly connected with said frame and disposed above the level of the lower points with a relatively unobstructed space extending laterally and longitudinally between the generally horizontal planes of said upper and lower points, a pair of rotatable beet-engaging members carried by said frame substantially at the level of and with their forward ends substantially directly behind said upper fixed points, means for driving said rotatable members, and beet-engaging transfer means carried by the frame substantially directly above the rotatable beet-engaging members.

11. The invention set forth in claim 10, further characterized by said upper fixed points being spaced farther apart laterally at their forward portions than said lower fixed points at their forward ends.

12. The invention set forth in claim 11, further characterized by a conveyor carried by said frame and extending downwardly and forwardly to a point substantially directly behind the rear portions of said rotatable members and positioned generally below said beet transfer means so as to receive beets therefrom.

13. In a harvester for beets or other crops, a mobile support, two separate ground entering crop lifting means disposed one above the other, one comprising an upper set of point members and the other comprising a lower set of point members disposed substantially directly underneath the upper point members, each of said upper point members having a rotatable beet engaging means movable about an axis of rotation extending generally longitudinally of the harvester, said rotatable beet engaging means being spaced apart generally laterally, means for supporting said upper and lower point members in vertically separated relation on said mobile support so that there is an unobstructed space extending laterally of the harvester between the rotatable beet engaging means and the forward portions of said lower point members, and means for driving said rotatable beet engaging means.

CLAUDE W. WALZ.
HOWARD F. CLAUSEN.

REFERENCES CITED

The following references are of record in the file of this patent:

UNITED STATES PATENTS

| Number | Name | Date |
|---|---|---|
| 814,747 | Sullivan | Mar. 13, 1906 |
| 1,102,272 | Jensen | July 7, 1914 |
| 1,123,897 | Lahti | Jan. 5, 1915 |
| 1,142,050 | Moore | June 8, 1915 |
| 1,298,708 | Hermann | Apr. 1, 1919 |
| 1,436,396 | Honsinger | Nov. 21, 1922 |
| 1,479,929 | Ricks | Jan. 8, 1924 |
| 1,568,594 | Flint | Jan. 5, 1926 |
| 1,668,157 | Kopitke | May 1, 1928 |
| 2,071,738 | Fechtner | Feb. 23, 1937 |
| 2,297,295 | Flintjer | Sept. 29, 1942 |
| 2,346,405 | Tramontini | Apr. 11, 1944 |
| 2,385,895 | Tramontini | Oct. 2, 1945 |
| 2,418,575 | Christiansen | Apr. 8, 1947 |

FOREIGN PATENTS

| Number | Country | Date |
|---|---|---|
| 36,377 | Denmark | Aug. 16, 1926 |